United States Patent [19]

Johnston, Jr.

[11] Patent Number: 4,989,826
[45] Date of Patent: Feb. 5, 1991

[54] EQUIPMENT ROOF MOUNTING SYSTEM
[76] Inventor: Robert G. Johnston, Jr., 323-B N. Federal Hwy., Boynton Beach, Fla. 33435
[21] Appl. No.: 402,568
[22] Filed: Sep. 5, 1989
[51] Int. Cl.$^5$ ............................................. F16M 13/00
[52] U.S. Cl. ...................................... 248/676; 52/39; 248/237; 403/374; 403/409.1
[58] Field of Search .............. 248/676, 678, 672, 237, 248/228, 188.9; 211/26; 52/39; 403/363, 374, 381, 409.1

[56] References Cited

U.S. PATENT DOCUMENTS

| | | | |
|---|---|---|---|
| 1,424,190 | 8/1922 | Cole et al. | 248/676 X |
| 1,564,131 | 12/1925 | Dunlap | 248/678 |
| 1,750,199 | 3/1930 | Spahn | 248/676 X |
| 1,750,200 | 3/1930 | Spahn | 248/676 X |
| 3,028,135 | 4/1962 | Funderburg, Jr. | 248/237 |
| 3,100,033 | 8/1963 | Hanson | 403/409.1 X |
| 3,221,400 | 12/1965 | Halsey | 248/676 X |
| 3,958,519 | 5/1976 | Merkle, Jr. | 248/228 X |
| 3,989,219 | 11/1976 | Pruett | 248/228 X |
| 4,364,695 | 12/1982 | Lenz | 248/676 X |
| 4,660,799 | 4/1987 | Butland | 248/676 |

Primary Examiner—David L. Talbott

[57] ABSTRACT

An air conditioning equipment roof mounting system particularly adapted for securable suspension of a piece of air conditioning equipment, such as a compressor, at a uniform height above the level of a flat horizontal roof.

7 Claims, 5 Drawing Sheets

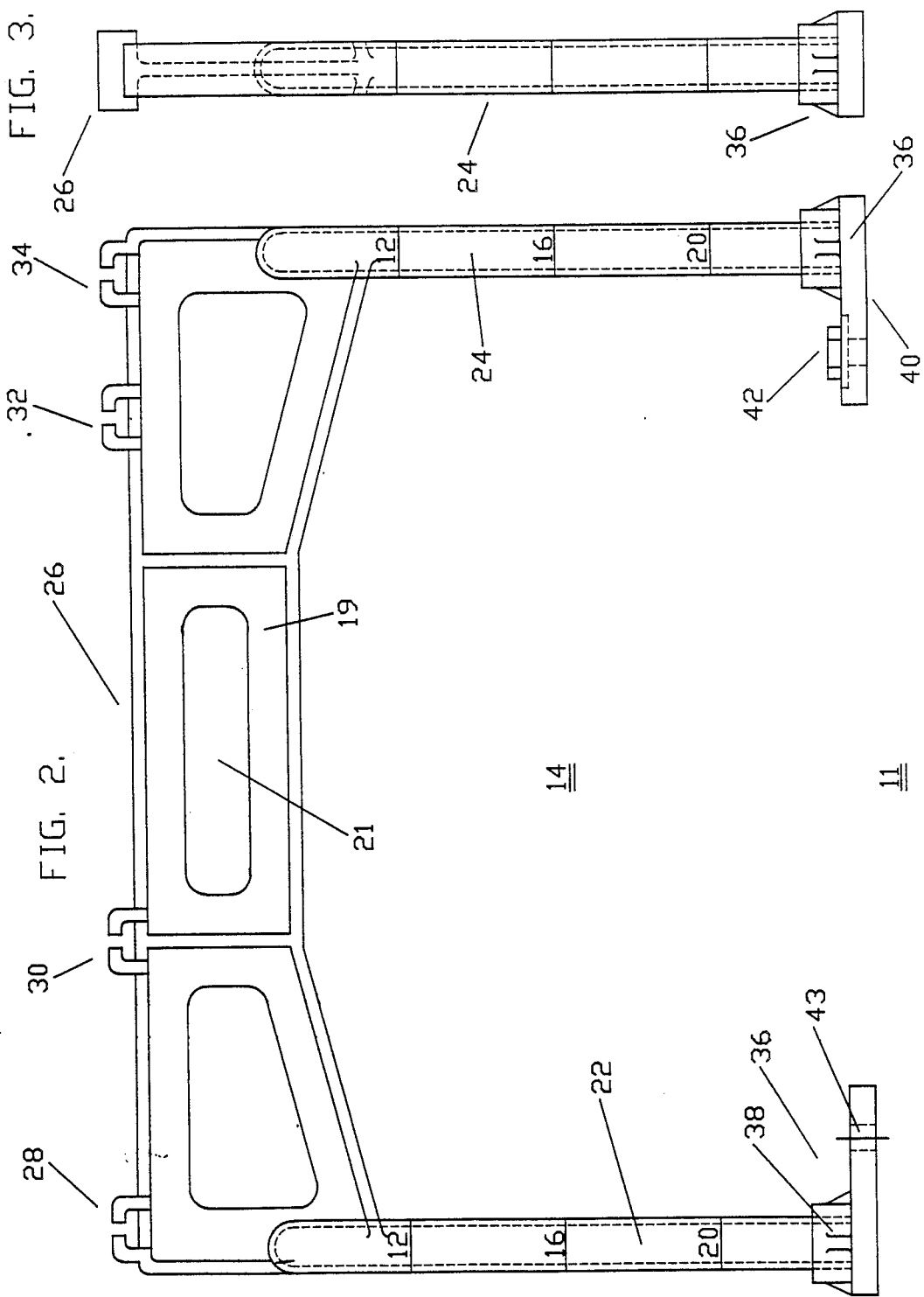

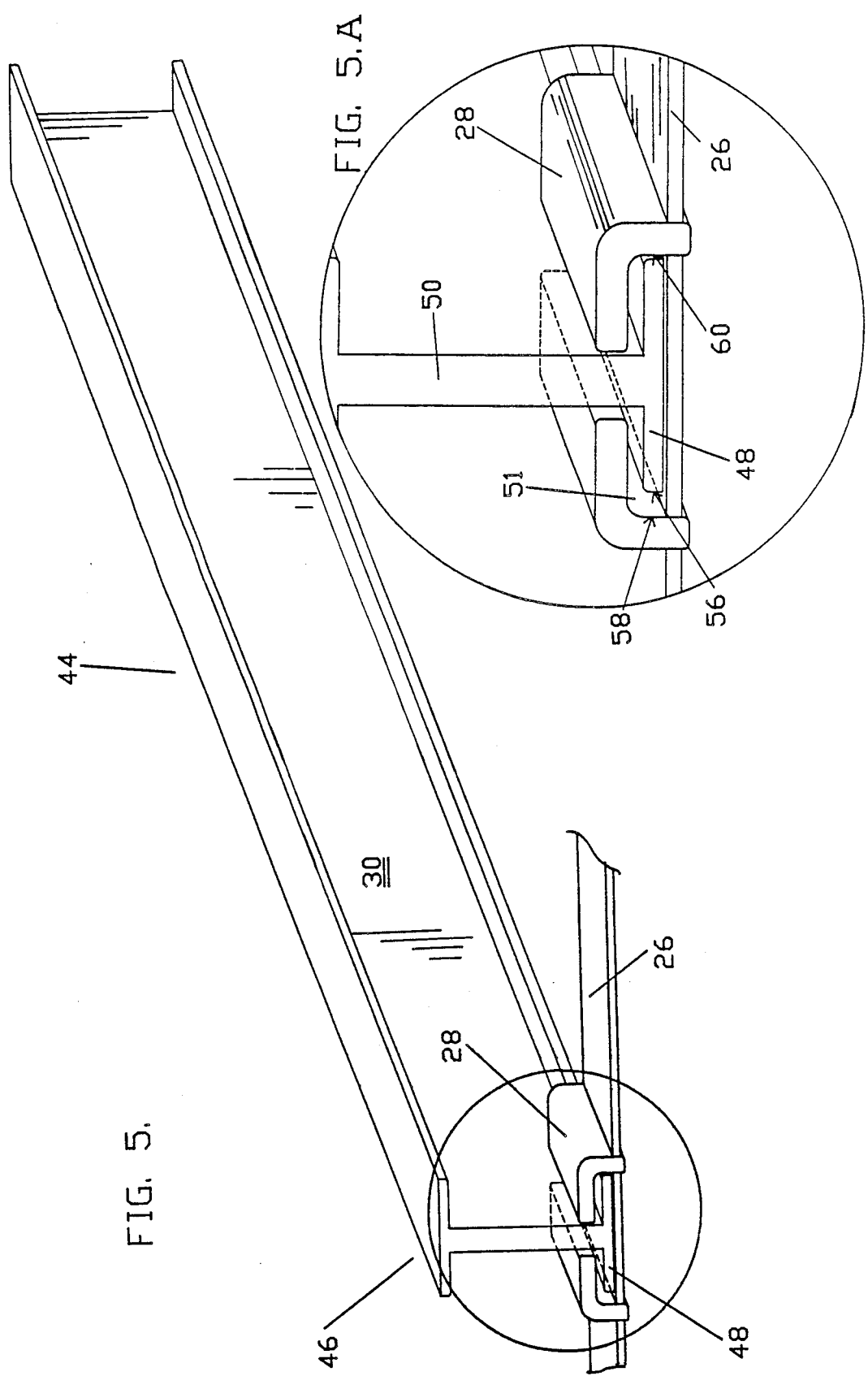

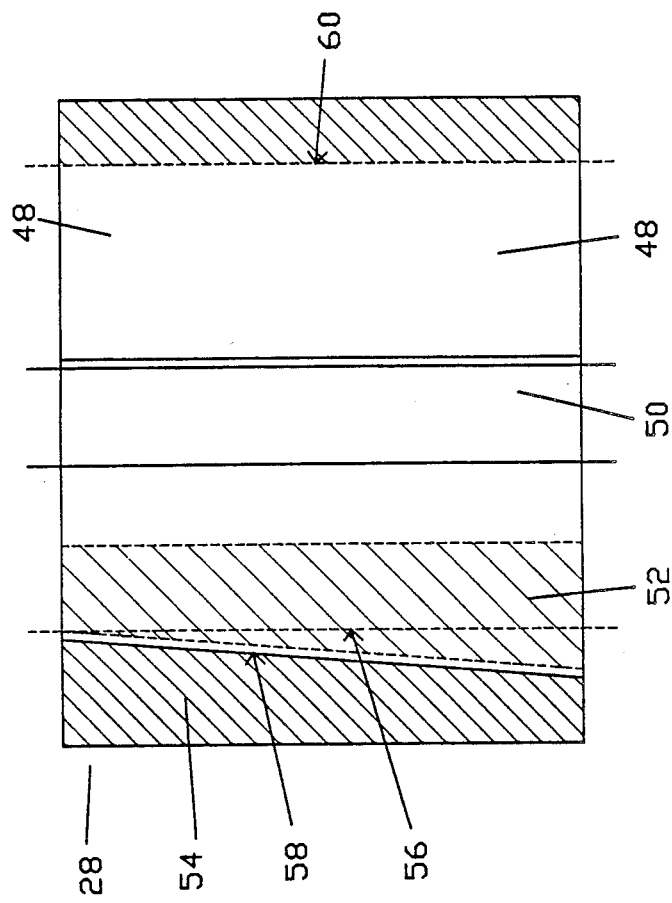
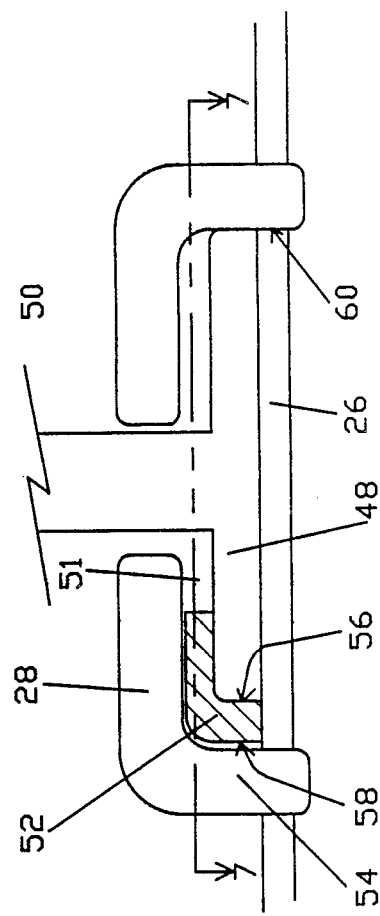
FIG. 7.
FIG. 6.

EQUIPMENT ROOF MOUNTING SYSTEM

BACKGROUND OF THE INVENTION

The present invention relates to an equipment roof mounting system particularly adapted for the securable suspension of a piece of air conditioning equipment, such as a compressor, at a uniform height above the level of a flat horizontal roof. In the prior art, it has been customary to place air conditioning equipment directly on top of a horizontal roof. Such roofs are typically covered by a layer of tar or asphalt. Over time, the effect of heat and the elements will cause the weight of the air conditioning equipment to penetrate into the layer of roofing material and, as well, the elements will cause the gradual rusting and degradation of the structural interface between the air conditioning equipment and the roofing material of the horizontal roof. Resultingly, a horizontal roof situated air conditioning compressor will gradually rust at its base while penetrating the layer of roofing material until the roof proper is reached. When this has occurred, damage to the roof and air conditioning equipment will accelerate and, in particular, will place electrical wiring and connection in the area of the base of the air conditioning equipment at risk.

As a response to the above problem, various regulatory groups, within the State of Florida and elsewhere, have proposed changes to the building codes which would prohibit the direct placement of air conditioning equipment upon a horizontal roof. Under such proposed building code regulations, all air conditioning equipment placed upon a building would require the support or suspension of such equipment upon a stand or bracket structure. It is, accordingly, as a response to such changes in the regulatory climate of the building industry that the present invention is directed.

Said proposed new building codes also require equipment support means which are non-conductive and non-corrosive. The instant invention accordingly responds in these areas to the needs for safer and more effective air conditioning equipment support means which have developed in the art.

That prior art, known to the inventor, in the instant art area consist of U.S. Pat. No. 1,707,203 (1929) to Thronley, entitled Cooling Device Stand; and U.S. Pat. No. 2,882,810 (1959) to Goettl, entitled Adjustable Support for Evaporative Coolers. Neither the device reflected in said patents, nor other devices known to the inventor, provide a suitable solution to the air conditioning equipment suspension problem above set forth.

SUMMARY OF THE INVENTION

The instant invention relates to a system for the support of equipment, such as air conditioning equipment, upon a horizontal roof. The inventive system includes least two parallel spaced apart trusses, each of said trusses having a pair of legs, which legs define lateral edges of each truss, and each of said trusses having a linear top edge extending between those lines which comprise axes of said legs, said top edge having a transverse width, each said edge having a plurality of integrally formed female track elements, each of said track elements having an axis normal to said top linear edge and normal to a plane defined by the body of each of said trusses. The system also includes one base element for each of said legs of each of said trusses, each of said base elements including a vertical recess proportioned for complemental engagement with a lower end of each of said legs, each of said base elements having a flat lower surface for engagement of said horizontal roof, said complemental engagement between said base elements and said legs of said truss including a rotational engagement relative to said legs, to thereby selectively position said lower surface of each base element respective to weight-bearing beams within said roof. The system further includes at least two I-beams, each I-beam having a top, a base and, parallel to said top and base, a rib integrally connecting said top and base, said base of each I-beam proportioned for complemental securable engagement within one of said female track elements of each of said trusses and normal to said plane defined by the body of each truss, in which securement of at least two of said I-beams between at least two of said trusses will define a suspension bed for said equipment to be supported upon said horizontal roof.

It is accordingly an object of the present invention to provide an improved system for the support of equipment, such as air conditioning equipment, upon a horizontal roof.

It is another object to provide an equipment support system of the above type in which the materials thereof are non-conductive and non-corrosive.

It is a further object of the present invention to provide an air conditioning equipment support system having enhanced structural reliability, and ease of assembly, as compared to functionally related systems known in the prior art.

It is yet another object of the present invention to provide a system for the support of air conditioning equipment upon a horizontal roof in which the height of the legs of such a system may be easily selected and in which said legs may be optimally positioned with respect to weight bearing beams within the horizontal roof.

It is a still further object of the invention to provide an equipment support system of the above type which will be low in vibration as compared to functionally related systems in the prior art.

It is a yet further object to provide a system of the above type in which pieces of equipment of varying lengths and widths can be readily accommodated from an inventive system formed of standardized modular constructional units.

The above and yet other objects and advantages of the present invention will become apparent in the hereinafter set forth Brief Description of The Drawings, Detailed Description of the Invention, and claims appended herewith.

BRIEF DESCRIPTION OF THE DRAWINGS

FIG. 2 is a front plan view of one truss and its associated base elements, of which the inventive system is formed.

FIG. 3 is a side plan view of the truss shown in FIG. 2.

FIG. 5 is an enlarged view showing the relationship between I-beams which support the equipment to be suspended and female tracks which are a part of each truss element of the system.

FIG. 5A is a further enlarged view of the portion of FIG. 5 which is encircled.

FIG. 6 is an axial, break-away end view of FIG. 5, however, also showing the use of an anti-vibration wedge element between the bottom of the I-beam and the inside surface of a track element.

FIG. 7 is a longitudinal cross-sectional view taken along line 7—7 of FIG. 8.

DETAILED DESCRIPTION OF THE INVENTION

Figure 1:
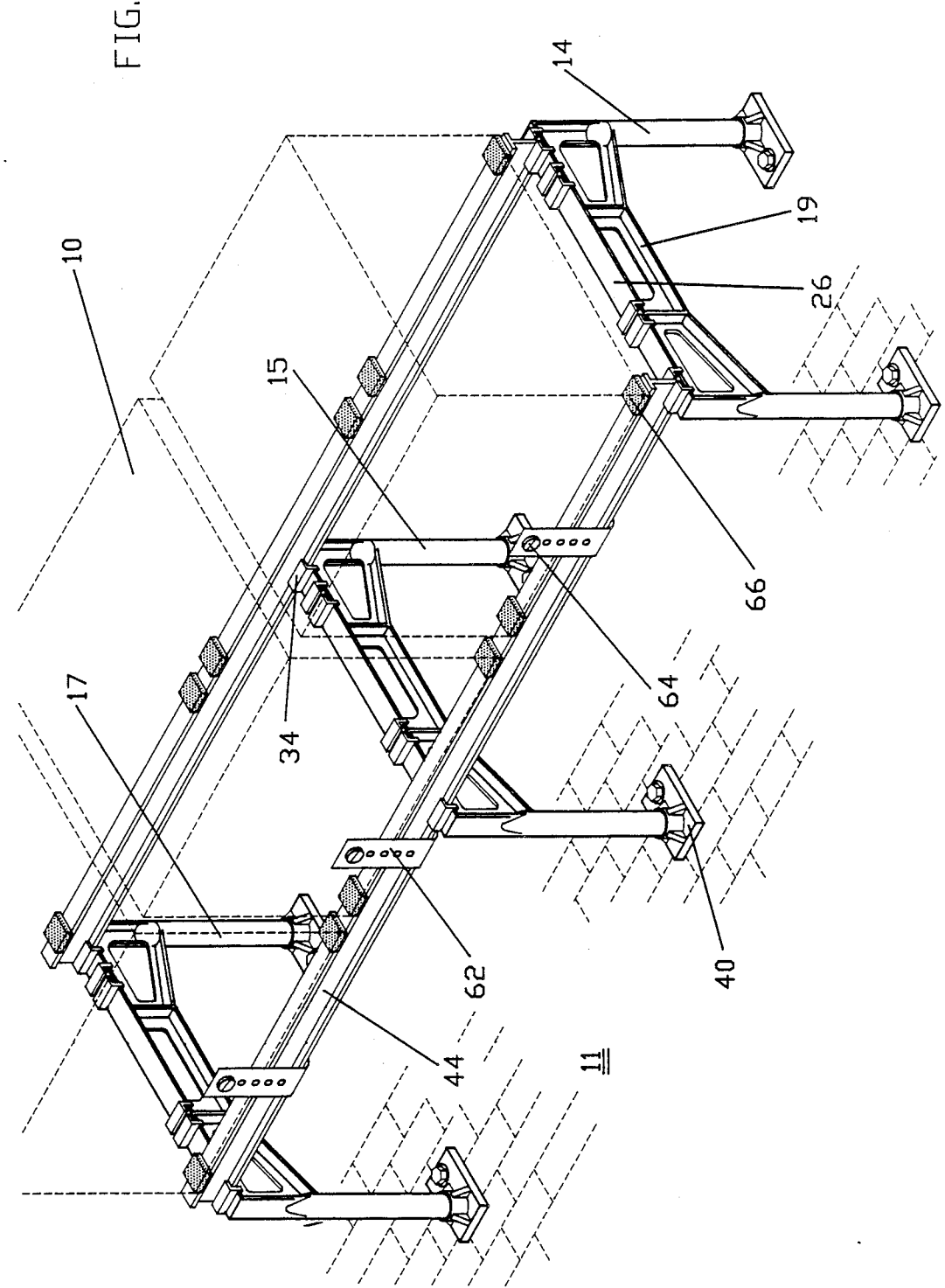
FIG. 1 is a perspective view showing the manner in which the inventive equipment support system provides a suspension bed for a piece of equipment to be located upon a horizontal roof.

With reference to FIG. 1 there is shown in perspective view a piece of equipment, in the nature of air conditioning equipment, which is to be supported above a roof, or similar structure 12.

As may be noted, a piece of equipment 10 rests upon a plurality of I-beam 44 (more fully described below) which in turn rest upon a plurality of trusses 14, 15 and 17. The number of such trusses used to support a given piece of equipment 10 will depend upon various factors including the longitudinal length of the equipment.

With reference to FIG. 2, it may be noted that each truss 14 consists of a web 19 which, in a preferred embodiment, consists of three sections, each having therein an opening 21. The lateral edges of each truss 14 are defined by legs 22 and 24. The top of each truss is defined by a flat linear edge 26. See also FIG. 3. Said top linear edge of the truss is provided with a plurality of female track element 28, 30, 32 and 34, the purpose of which is to support said I-beam 44 in a combination suitable to support the transverse width of equipment 10. That is, by insertion of I-beams 44 into various combinations of said female track elements 28, 30, 32 and 34 e.g., track 28 with track 30, track 28 with track 34, track 30 with track 32, track 30 with track 34, and track 28 with track 34 (as is shown in FIG. 1), pieces of equipment 10 of various widths may be accommodated. Accordingly, though variation in the number of trusses 14 that are employed, and the combination of track elements which are employed, pieces of equipment of varying longitudinal lengths and transverse widths may be accommodated.

A further variable which, in many equipment suspension situations require adjustment, is that of the height of the equipment above the roof 11. In the instant invention, this problem is addressed through the formation of the truss 14 of a non-conductive, non-corrosive plastic polymer, such as a glass-filled nylon or glass-filled polyester. This is achieved through the selective cutting of legs 22 and 24 at the appropriate circumference of the leg which is designated in FIG. 2 by numerals 12, 16, and 20. These numbers indicate the number of inches above roof 11 that flat linear edge 26 will be if the legs 22 and 24 of truss 14 are cut at the line so designated. In other words, if said legs are cut at the lines designated "16", top linear edge 26 will be sixteen inches above roof 11, when the adjustment 10 is in place, this, thereby, taking into account the height of the I-beams 44 when placed into tracks 28, 30, 32 or 34. If, as in the case in FIGS. 2 and 3, the pre-formed height of the truss is appropriate to a given application, no cutting of the legs will be necessary. In a preferred embodiment, where no cutting is desired, the height of the equipment 10 will be twenty four inches above floor 12.

With reference to base elements 40, shown in FIGS. 1 through 4, it is to be appreciated that said elements are provided with a vertical recess 38 which is proportioned for complemental engagement with a lower end of each of said legs 22 and 24. Said engagement is a rotatable one which, thereby, permits rotation of the base element 40 relative to the axis of the leg to thereby permit a flat lower surface 40 thereof to be rotated into a favorable position relative to weight-bearing beams of roof 12. It is to be appreciated that in a given embodiment lower surface 40 of base element 36 may be larger and may be symmetric relative to the axis of the legs of the truss. After lower surface 44 has been appropriately positioned relative to the weight bearing beams of the roof a, screw 42 is inserted through hole 43 and therefrom surface 40 is secured into roof 11. It is to be appreciated that flat lower surface 30 of the base element of 36 will also provide lateral stability to the plurality of trusses 14, 15 and 17 shown in the view of FIG. 1.

Figure 4:
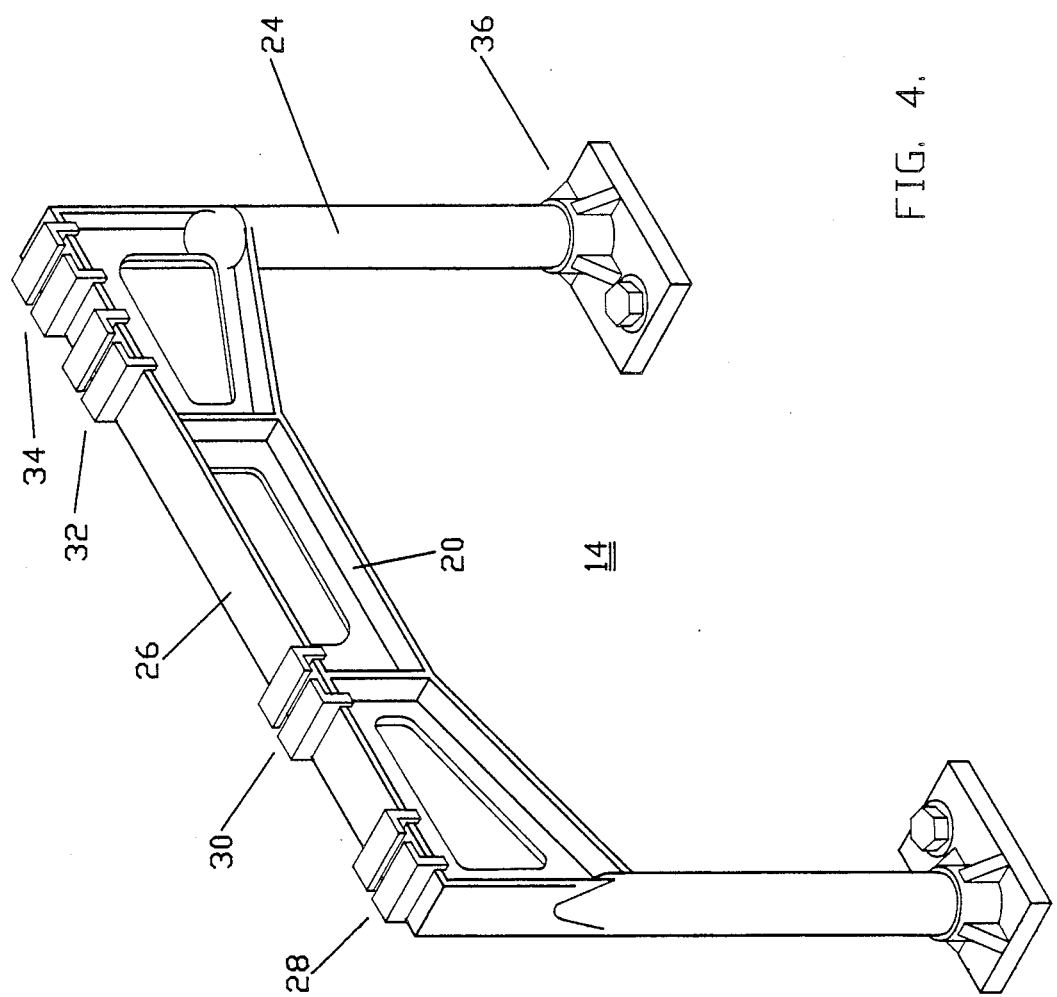
FIG. 4 is an isometric view of one truss element.

The individual truss 14 is shown in isometric view in FIG. 4.

In FIGS. 5 and 5A there is shown an enlarged end view of the interface between I-beam 44 and the female tracks. Therein, as may be noted, I-beam 44 which consists of a top 46, a base 48 and a normal connecting web 50 is slipped into track element 28 so that element 28 surrounds bottom 48 of the I-beam and a portion of the rib 50. This is more fully shown in the enlarged view of FIG. 5A. Therein, there exists a region 51 within which bottom 48 of the I-beam 44 may be susceptible to lateral movement or vibration. This problem is, in the instant invention, solved through the use of a longitudinal wedge like element 52 (shown in FIGS. 6 and 7). Said longitudinal element 52 is press fittably secured within region 51 after bottom 48 of I-beam 44 has been slid into the female track 28. As may be noted in the longitudinal cross-sectional view of FIG. 7, the horizontal dimension of wedge 52 decreases as it moves away from the face of the track shown in the view of FIG. 6. Further, as the lateral width of wedge 52 decreases, the width of wall 54 of track 28 increases (See in particular FIG. 7). Accordingly, the result of the press fittably insertion of wedge element 52 into opening 51 is that wall 56 of base 48 of I-beam 44 will be both longitudinally and transversely secured relative to wall 58 of end 54 of female track 28. One wedge element 52 will of course be used for each of the I-beam/female track connections which is employed in the assembly of a system of the type shown in FIG. 1.

A further consequence of the use of wedge 52 is that wall 60 of base 48 will be maintained in a secure relationship against the opposing inside wall of female track 28. The result is a system which is secure against movement, whether axial, lateral, or vibrational. As such, the supported piece of equipment 10, after it is placed upon I-beams 44 and their associated pads 62, and strapped to trusses 14, 15 and 17 employing straps 64, will be reliably suspended above roof 11 for an indefinite period. As such, equipment 10 will be unable to degrade the surface of roof 11 and will not be able to affect any associated electrical connections or the like. Also, it will often be possible to service equipment 10 while it is kept in place upon a system of the type shown in FIG. 1 in that all surfaces of the equipment will be readily accessible.

Accordingly, while there has been shown the preferred embodiment of the present invention, it is to be appreciated that the invention may be embodied otherwise than is herein specifically shown and described and that within such embodiments, certain changes in the detail and construction of the parts may be made without departing from the underlying idea or principles of this invention within the scope of the claims appended herewith.

Having thus described my invention, what I claim as new, useful and non-obvious and, accordingly secure by Letters Patent of the U.S. is:

1. A system for the support of equipment upon a substantially horizontal roof comprising:
   (a) at least two parallel spaced-apart trusses, each of said trusses having a pair of legs which legs define lateral edges of each truss, each of said trusses having a linear top edge extending between those lines comprising longitudinal axes of said legs, said top edge having a transverse width, each of said edges having a plurality of integrally formed female track elements, and each of said track elements having axes normal to said linear edge of each of said trusses;
   (b) one base element for each of said legs of each of said truss, each of said base elements including a recess proportioned for complemental engagement with a lower end of each of said legs, each base having a flat lower surface for engagement of said horizontal roof, said complemental engagement including rotational engagement of said flat surface relative to said legs to thereby selectively position said lower surface in an optimal fashion respective to weight bearing beams within said roof; and
   (c) at least two I-beams, each I-beam having a top, a base parallel to said top, and a rib normally integrally connecting said top and base of said I-beam, said bottom of each I-beam proportioned for complemental, securable, slideable engagement within each of said female track elements, and normal to a plane defined by the body of each of said trusses,
   whereby securement of at least two of said I-beams between at least two of said trusses will define a suspension bed for said equipment to be supported upon a horizontal roof.

2. The support system as recited in claim 1, further comprising:
   a wedge means proportioned for press-fit insertion between the interior surface of said female track elements and the surface of said base of said I-beams to thereby reduce the potential for axial, lateral, and vibrational movement of said I-beam relative to said tracks.

3. The system as recited in claim 1 in which said legs of said trusses comprise a polymer material having properties permitting the selectable cutting of the length thereof.

4. The system as recited in claim 3 in which said legs of said trusses are provided with indicia corresponding to a distance that would exist between said roof and the top of said I-beams if said legs were cut circumferentially at the points of such respective indicia.

5. A system for the support of equipment upon a substantially horizontal roof, comprising:
   (a) at least two parallel spaced-apart trusses, each of said trusses having a pair of legs which legs define lateral edges of each truss, each of said trusses having a linear top edge extending between those lines comprising longitudinal axes of said legs, said top edge having a transverse width, each of said edges having a plurality of integrally formed female track elements, and each of said track elements having axes normal to said linear edge of each of said trusses;
   (b) one base element for each of said legs of each of said truss, each of said base elements including a recess proportioned for complemental engagement with a lower end of each of said legs, each base having a flat lower surface for engagement of said horizontal roof, said complemental engagement including rotational engagement of said flat surface relative to said legs to thereby selectively position said lower surface in an optimal fashion respective to weight bearing beams within said roof; and
   (c) at least two weight-bearing beams, each beam having a top and a bottom, said bottom of each beam proportioned for complemental, securable, slidable engagement within each of said female track elements, and positioned normally to a plane defined by said trusses,
   whereby securement of at least two beams between at least two of said trusses will define a suspension bed for said equipment to be supported upon a horizontal roof.

6. The system as recited in claim 5 in which said legs of said trusses comprise a polymeric material having properties permitting the selectable cutting of the length thereof.

7. The system as recited in claim 6 in which said legs of said trusses comprise indicia corresponding to a distance that would exist between said roof and the top of said beams if said legs were cut circumferentially at the points of such respective indicia.

* * * * *